United States Patent [19]

Sanjurjo et al.

[11] Patent Number: 4,642,228

[45] Date of Patent: Feb. 10, 1987

[54] FLUXING SYSTEM FOR REACTORS FOR PRODUCTION OF SILICON

[76] Inventors: Angel Sanjurjo, 15010 Penitencia Creek Rd., San Jose, Calif. 95132; Kenneth M. Sancier, 561 Berkeley Ave., Menlo Park, Calif. 94025

[21] Appl. No.: 758,597

[22] Filed: Jul. 24, 1985

[51] Int. Cl.⁴ .............................................. C01B 33/02
[52] U.S. Cl. .................................... 423/350; 423/349; 431/39
[58] Field of Search .................... 423/350, 349; 431/29

[56] References Cited

U.S. PATENT DOCUMENTS 4,442,082  4/1984  Sanjurjo ............................... 422/187

Primary Examiner—John Doll
Assistant Examiner—Lori S. Freeman
Attorney, Agent, or Firm—Hedman, Gibson Costigan & Hoare

[57] ABSTRACT

A process is disclosed for the production of elemental silicon that utilizes a non-reactive condensible gas as a means for purging the reactor of ambient air prior to the introduction of an alkali metal and a silicon tetrahalide.

10 Claims, 1 Drawing Figure

FLUXING SYSTEM FOR REACTORS FOR PRODUCTION OF SILICON

BACKGROUND OF THE INVENTION

The reduction of a gaseous transition metal halide such as silicon with an alkali metal such as sodium has been described in the prior art. In that procedure, a sweep of the reactor with dry argon has been utilized to exclude atmospheric moisture and oxygen before initiating the reaction. This is done to prevent the alkali metal from reacting with water and forming undesirable by-products. In an alternative procedure, a vacuum pump has been used to evacuate the reactor before introduction of the reactants in order to remove atmospheric moisture and oxygen. The use of dry argon results in the discharge into the ambient atmosphere of argon which is not recycled. The use of a vacuum chamber requires the use of a high strength reactor and sealing means that prevent the entry of atmospheric moisture and oxygen. The expense of constructing specialized vacuum reactors and the introduction of contaminants from seal lubricants or gaskets have rendered these approaches unsatisfactory. The applicants have discovered a process for removal of the ambient air and moisture from a reactor which avoids the need to use argon or a high vacuum. The process comprises the use of a non-reactive, condensible gas that is passed into the reactor to expel ambient air. Thereafter the reactor is filled with the gaseous transition metal halide and the non-reactive condensible gas is transferred to a condensing zone where it is separated from the gaseous transition metal halide. Thereafter the separated gaseous transition metal halide is recycled to the reactor and the non-reactive, condensed gas is placed in a reservoir from which it is recycled via an expansion valve when it is required to expel atmospheric moisture and oxygen from the reactor.

DETAILED DESCRIPTION OF THE INVENTION

Figure 1:
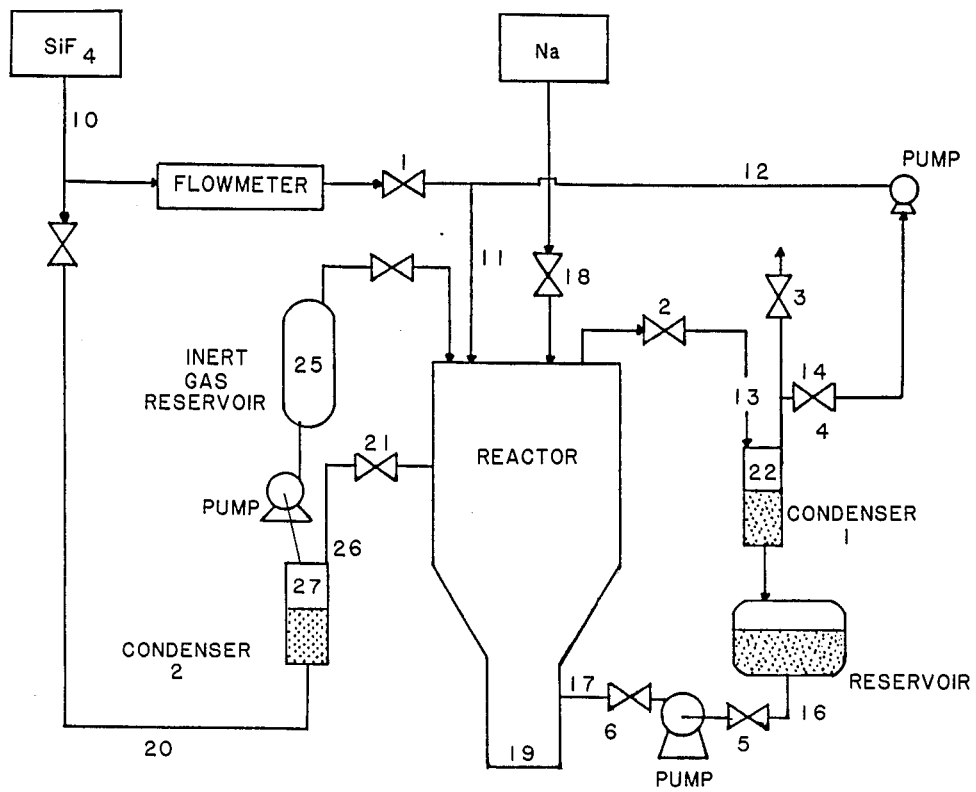
FIG. 1 is a schematic diagram of an apparatus for the practice of invention.

In the U.S. Pat. No. 4,442,082, which is incorporated by reference, there is described a general reaction scheme for the reduction of a transition metal halide using an alkali metal. This reaction is also described in Final Report, "Novel Duplex Vapor - Electrochemical Method for Silicon Solar Cell", by: L. Nanis, A. Sanjurjo, K. Sancier and R. Bartlett, March 1980, which is incorporated by reference.

The invention may be practiced by the production of substantially pure elemental silicon, by a process comprising the steps of:

(a) passing a non-reactive gas that is condensible at a temperature from about $-90°$ C. to $+50°$ C. and preferably $-60°$ C. to $+20°$ C. at atmospheric pressure into a reaction zone to displace ambient air;

(b) passing a silicon, tetrahalide into said reaction zone to displace said non-reactive condensible gas;

(c) passing an alkali metal into said reaction zone to obtain a mixture of silicon, and an alkali metal halide.

For this system to work, the non-reactive, condensible gas (NRCG) must be removed by condensation at a sufficiently low temperature so that its vapor pressure is very low, typically less than 1 torr. In this way, the NRCG (1) will not be lost during displacement of air from the reactor and (2) it will not contaminate the halogenated silane ($SiF_4$). The lowest possible temperature for condensation must be at least slightly above $-94.8°$ C. at which temperature the vapor pressure of the $SiF_4$ is 1 atmosphere, otherwise $SiF_4$ will condense. Therefore, we must select the candidates for the NRCG so that their vapor pressures are sufficiently low at the temperature of condensation.

Also, the flushing of the reactor with the NCRG must be done after the reactor is cool enough to prevent (1) thermal decomposition of the NRCG or (2) its reaction with $SiF_4$ or oxygen from air.

The non reactive condensible gas that is condensible at a temperature of $-90°$ C. to $+50°$ C. may be one of but not limited to:

|  | b.p.(°C.) (760 mm Hg) |
|---|---|
| trichlorofluoromethane | 25° |
| dichlorodifluoromethane | −29° |
| chlorodifluoromethane | 41° |
| 1,1-diflourethane | −25° |
| 1-chloro-1,1-difluoroethane | −10° |
| 1,1,2-trichloro-1,2,2-trifluoroethane | 48° |
| 1,2-dichloroo-1,1,2,2-tetrafluoroethane | 3.8 | and mixtures thereof.

The especially preferred non-reactive condensible gases are those which will condense between $-30°$ and $5°$ C., and that have very low vapor pressures in the condensed phase. Other gases such as sulfur dioxide may be utilized. The process is carried out by passing the non-reactive, condensible gas into a reaction zone so that it displaces the ambient air. Thereafter the inlet for the non-reactive condensible gas is closed and the tetrahalide compound is passed into the reaction zone where it mixes with and expels the non-reactive condensible gas. The flow of tetrahalide compound is continued for a period of time so that substantially all of the reaction zone will be filled with the tetrahalide gas.

The non-reactive condensible gas and the mixture of the non-reactive condensible gas with air or the tetrahalide compound are transferred from the reaction zone to a suitable condensing zone. The condensing zone will have means for venting ambient air that is separated from the non-reactive condensible gas and the tetrahalide gas. In addition means will be provided for the separation of the tetrahalide gas from the non-reactive, condensible gas. The non-reactive condensible gas is liquified in a condenser and the liquid is passed to a reservoir from which it may be recycled and expanded to a gas for reuse in the reaction zone.

After the tetrahalide gas displaces substantially all of the non-reactive condensible halide, the reaction may be initiated by introducing the alkali metal. The reaction is terminated by turning off the inlet of alkali metal and before removal of the reactants from the reactor any tetrahalide gas is removed by using an inert gas which moves the tetrahalide gas from the reactor to means for condensing the tetrahalide gas from the streams of inert gas and tetrahalide gas. The invention may be utilized in batch type reactors or in continuous production reactors. The inert gas is separated in the means for condensing the inert gas and is passed to a reservoir in which it may be stored and recycled to the reactor when needed.

The temperature in the condensing means will be low enough to cause the inert gas that is being utilized to condense. The gas should have a very low vapor pressure typically below 1 torr and preferably under 1 m torr. The preferred gaseous halide is silicon tetrafluoride and the preferred alkali metal is sodium.

DETAILED DESCRIPTION OF THE PREFERRED EMBODIMENTS

FIG. 1 illustrates a batch type reactor for use in the practice of the invention.

To start a reactor that has been opened to the air, the non-reactive condensible gas such as dichlorodifluoromethane is passed into the reactor through line 17 after being expanded by valve 6. The dichlorodifluoromethane pushes out the ambient air from the reactor through valve 2.

The ambient air passes through line 13 into the condenser 22 which is operated at a temperature that does not condense the air but does condense the dichlorodifluoromethane and the air passes through the condenser and is pumped out of the system through valve 3 in line 14. The dichlorodifluoromethane is condensed in the condenser and passed through line 15 to a reservoir 23. The non-reactive condensible gas is recycled to the reactor through line 16 using a pump and valve 5 to control the flow to the reactor. When the partial pressure of $O_2$ in the reaction zone is below 1 m torr, as determined by a standard oxygen sensor, valve 5 is closed and valve 1 is opened to allow the silicon tetrahalide gas to flow into the reactor through line 11 and expel the dichlorodifluoromethane through valve 2. The mixture of $SiF_4$ and the non-reactive condensible gas are separated in the condenser and the $SiF_4$ is passed through valve 4 to line 12 where it is recycled to the reactor by means of a pump. Valve 1 is a constant pressure valve set to deliver $SiF_4$ at 1 atmosphere. As the condensible gas is condensed the pressure drops and valve 1 automatically admits more $SiF_4$. When substantially all of the dichlorodifluoromethane is removed from the reactor, as determined by no flow of $SiF_4$ into the system through valve 1, valve 2 is closed and sodium metal is introduced through valve 18 to initiate the reaction. Before introducing sodium, the amount of air in the reactor can be monitored using a conventional on-line gas sampling means such as gas chromatography or mass-spectroscopy. The procedure for removing the ambient air is repeated before restarting the reactor anytime that the reactor is shut down and air is introduced by opening removal door 19.

The line 14 is provided with off take valve 4 which is connected to line 12 to recycle separated silicon tetrafluoride gas to intake line 11. Valve 1 controls the flow of silicon tetrafluoride from intake line 11 and recycle line 20.

The means for purging silicon tetrafluoride gas from the reactor when it is shut down comprise a valve 24 and inert gas reservoir 25. The reaction is terminated by closing valves 1 and 18. Any unreacted silicon tetrafluoride gas is removed from the reactor by opening valve 24 and 21 and causing an inert gas such as argon to push the silicon tetrafluoride through line 26 to a condenser 27 that condenses the silicon tetrafluoride but not the inert gas. Valve 24 is a constant pressure valve set to deliver argon at 1 atm of pressure. The separated inert gas is pumped to a reservoir 25 to be recycled and the condensed silicon tetrafluoride can later be passed via line 20 to expansion valve 28 where it is expanded and recycled to the reactor. Once the reactor is filled with argon, the reactor can then be opened to the atmosphere.

We claim:
1. A process for the production of substantially pure elemental silicon said process comprising the steps of:
   (a) passing a halogenated hydrocarbon gas containing one or more fluorine atoms that is condensible from $-90°$ C. to $+50°$ C. at atomspheric pressure into a reaction zone for use in the production of elemental silicon, through the reduction of the corresponding gaseous halide by means of an elemental alkali metal;
   (b) passing a silicon tetrahalide into said reaction zone to displace said condensible halogenated hydrocarbon gas;
   (c) passing an alkali metal into said reaction zone to obtain a mixture of silicon and an alkali metal halide; and
   (d) separating substantially pure silicon from said mixture.

2. A process as defined in claim 1 wherein elemental silicon is produced and the halogenated hydrocarbon gas containing one or more fluorine atoms is selected from the group consisting of dichlorodifluoromethane, bromotrifluoromethane, dibromodifluoromethane, 1,1,2-trichloro-1,2,2,-trifluoroethane, 1,2-dichloro-1,1,2,2,-tetrafluoroethane and mixtures thereof.

3. A process for the production of substantially pure silicon, as defined in claim 2 wherein the silicon tetrahalide is silicon tetrafluoride.

4. A process for the production of substantially pure silicon as defined in claim 3 wherein the alkali metal is sodium.

5. A process for the production of substantially pure silicon as defined in claim 4 wherein the halogenated hydrocarbon gas containing at least one fluorine atom is dichlorodifluoromethane.

6. A process for the production of substantially pure silicon as defined in claim 1 wherein the process comprises a further step wherein the halogenated hydrocarbon gas containing one or more fluorine atom is condensed, after it is displaced by the silicon tetrahalide, and recycled to the reaction zone.

7. A process for the production of substantially pure silicon as defined in claim 6 wherein ambient air is separated from the halogenated gas containing one or more fluorine atoms and said ambient air is vented to the atmosphere through a scrubber.

8. A process for the production of substantially pure silicon as defined in claim 7 wherein after the reaction is terminated, an inert gas is passed into the reactor to remove any unreacted silicon tetrafluoride as a mixture of inert gas and unreacted silicon tetrafluoride.

9. A process for the production of substantially pure silicon as defined in claim 8 wherein the unreacted silicon tetrafluoride is separated from the mixture of inert gas and silicon tetrahalide in a condenser.

10. A process for the production of substantially pure silicon as defined in claim 9 wherein the unreacted silicon tetrafluoride that is condensed from the mixture of inert gas and silicon tetrafluoride, is recycled to the reactor.

* * * * *